Figure 1:
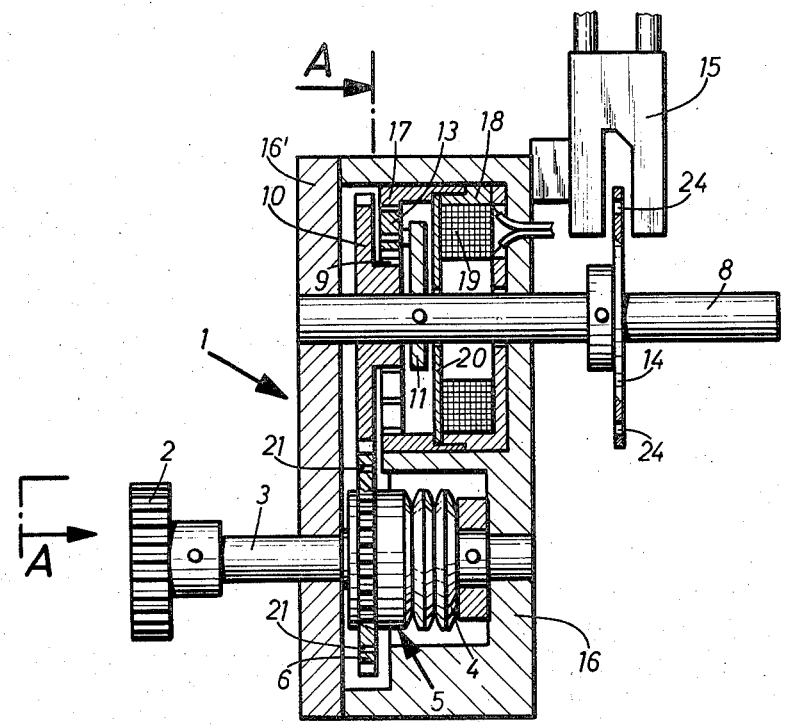

United States Patent [19]
Haupt et al.

[11] 3,817,359
[45] June 18, 1974

[54] SINGLE OR MULTIREVOLUTION PAWL CLUTCH

[75] Inventors: Günter Haupt, Grestetten/Wuttemburg; Edwin Lässle, Langenau; Karl-Heinz Heisele, Oberstotzingen, all of Germany

[73] Assignee: Walther Bueromaschinen GmbH, Gerstetten, Germany

[22] Filed: May 2, 1973

[21] Appl. No.: 356,360

[30] Foreign Application Priority Data
May 3, 1972 Germany.................. 2221532

[52] U.S. Cl. ........... 192/17 C, 192/12 B, 192/33 R, 192/84 P, 192/84 T, 74/125.5
[51] Int. Cl. ......................................... F16d 67/06
[58] Field of Search............ 192/14, 12 B, 12 D, 28, 192/33 R, 17 C, 84 T, 90, 148, 84 P; 74/125.5

[56] References Cited
UNITED STATES PATENTS
| | | | |
|---|---|---|---|
| 1,972,978 | 9/1934 | Carroll et al................... | 192/149 |
| 2,647,600 | 8/1953 | Anderson...................... | 192/28 X |
| 2,858,388 | 10/1958 | Eastman....................... | 192/28 X |
| 2,900,214 | 8/1959 | Johnson........................ | 192/28 X |
| 3,367,460 | 2/1968 | Wanner......................... | 192/12 B |
| 3,603,437 | 9/1971 | Spencer........................ | 192/148 |

FOREIGN PATENTS OR APPLICATIONS
683,055 10/1939 Germany.................... 74/125.5

*Primary Examiner*—Allan D. Herrmann
*Attorney, Agent, or Firm*—Edmund M. Jaskiewicz

[57] ABSTRACT

A single or multirevolution pawl clutch for coupling rotating transfer systems comprises driving and driven shafts mounted in a housing and a pawl mounted on the driven shaft. A stationary ratchet ring surrounds the driven shaft and has teeth thereon engageable by the pawl. A driving member is drivingly connected to the driving shaft by gearing and has teeth thereon engageable by the pawl which is urged into engagement with the driving member by a spring. A magnetic coil can be energized by pulse signals so that upon energization the pawl is magnetically attracted into engagement with the ratchet ring such that the driven shaft is disengaged and upon the energization the pawl is engaged with the driving member under the action of the spring to engage the driven shaft.

6 Claims, 2 Drawing Figures

SINGLE OR MULTIREVOLUTION PAWL CLUTCH

The present invention relates to single or multirevolution pawl clutches for the temporary coupling of rotating transfer systems, such as the high speed printing units of office machines, more particularly, to the precise control of the driven shaft so that the driven shaft can be stopped in a predetermined position.

Various forms of pawl clutches have been devised wherein various forms of pawls are controlled mechanically by a clutch into and out of engagement and disengagement positions. Such clutches have been employed in many applications such as to function as stop devices for register drum.

It has also been proposed to construct a single revolution clutch for high speed calculators wherein the angular velocity of the driven member is reduced with respect to that of the driving member in the vicinity of the end position of the cycle, as defined by a stop. This type of clutch includes a pivotable clutch pawl. The sector angle between the driving edge of the pawl on the driving member and on the center of its pivot is reduced during disengagement and the engaged pawl rests on a stop of its support under the action of a spring as well as of the force of reaction to the coupling force. This force of reaction acts in the same direction as the direction of rotation and the pawl thus forms a rigid driving extension for the driving member. During disengagement, i.e., during the movement of the support established by the stop against the switching extension, the pawl is taken along by the coupling tooth of the driving member while overcoming the force of the pawl spring and in this connection rotates about its pivot to reduce the sector angle.

All of these known pawl clutches are generally not completely satisfactory since these clutches have very few or no possibilities of variation since their stop or abutment possibilities are limited to only one or to a very small number. Even when there are several stop possibilities, a corresponding series of control mechanism must be positioned around and within the clutch housing which significantly increases the cost of the clutch because of the greatly increased number of components and the cost of fabrication. Further, these pawl devices generally strike with relatively great force against their stops or abutments even when some form of a braking structure is provided. As a result, they contribute significantly to noise pollution and have significantly greater wear and even destruction of components during operation.

It is therefore the principal object of the present invention to provide a novel and improved single or multirevolution pawl clutch particularly adapted for coupling rotating transfer systems.

It is another object of the present invention to provide a pawl clutch wherein a driven shaft rotating at a very high speed can be stopped in a precise predetermined position.

According to one aspect of the present invention, a single or multirevolution pawl clutch may comprise a housing having driving or driven shafts mounted therein. A suitable light barrier means is provided for each of the shafts and is fixably mounted to the housing. A pawl is mounted on the driven shaft and a stationary ratchet ring surrounds the driven shaft and is engageable by the pawl. A driving member is drivingly connected to the driving shaft and is also engageable by the pawl which is urged by a spring into engagement with the driving member. There is also provided a magnetic coil which is precontrolled and which can be subjected to the effect of pulse signal sequences. Energization of the coil will cause the pawl to be magnetically attracted into engagement with the stationary ratchet ring to disengage the driven shaft and deenergization of the coil will cause the pawl to engage the driving member under the action of the spring so as to engage the driven shaft.

Figure 2:
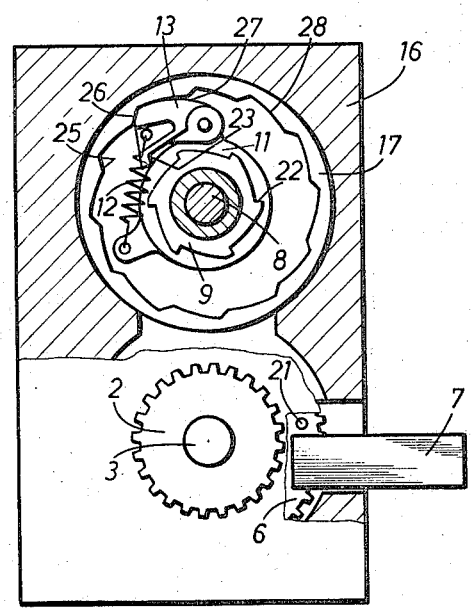

Other objects and advantages of the present invention will be apparent upon reference to the accompanying description when taken in conjunction with the following drawings, which are exemplary, wherein:

FIG. 1 is a schematic cross sectional view of a pawl clutch according to the present invention; and FIG. 2 is a sectional view taken along the line A—A of FIG. 1, the lower portion of the view being in elevation.

Proceeding next to the drawings wherein like reference symbols indicate the same parts throughout the various views a specific embodiment of the present invention will be described in detail.

As can be seen in FIG. 1, a pawl clutch is indicated generally at 1 and is driven by a pinion 2 mounted on a driving shaft 3 on which is positioned a friction clutch 5 operated by means of cup springs 4. The clutch 5 drives a gear 6 which is also constructed as a timer disk and includes a plurality of light openings or slits 21 as can be seen in FIG. 2. The gear 6 is scanned by a light barrier 7 which is known in the art and may comprise suitable means for generating a light beam interrupted by the gear 6.

The gear 6 is engaged by a gear 10 which is rotatably supported on a driven shaft 8. The gear 10 is fixedly connected to an engaging member 9 as can be seen in FIG. 1. The driving torque is thus transmitted by pinion 2 through driving shaft 3, friction clutch 5 and gears 6 and 10 to the engaging member 9.

A pawl 13 is pivotally mounted on a pawl support 11 which is secured to the driven shaft 8 and is positioned in the radial plane of the engaging element 9. A spring 12 is connected to the pawl 13 and pawl support 11.

A timer disk 14 is fixed upon the driven shaft 8 and is scanned by means of light barrier 15. A stationary ratchet ring 17 which acts as a stop for the pawl 13 is fixed within a housing 16 for the clutch. A cover plate 16' closes the housing. The light barriers 7 and 15 are fixed to the clutch housing 16.

The ratchet ring 17 is in a magnetic circuit constituted by a magnetic element 18 together with a magnetic coil 19 which is shielded by means of a disk 20 with respect to the engaging member 9 and pawl support 11.

Upon energization of the magnetic coil 19, magnetic flux extends through the magnetic element 18, ratchet ring 17 as well as the pawl support 11 and pawl 13. As a result, the pawl is attracted to the ratchet ring 17 by magnetic flux. The gear 10 and engaging member 9 are made of a nonmagnetic material in order to avoid any magnetic short circuit that might appear.

In order to best describe the operation of the pawl clutch disclosed herein, it is initially assumed that the driving shaft 3 is rotating, the magnetic coil 19 is energized and the driven shaft 8 is stopped.

The gear 6 which is mounted on the driving shaft 3 is provided with a number of holes or slits 21 which correspond in number to the teeth 22 on the engaging member 9. The angular relationship of the engaging member 9 and the gear 6 with respect to each other is identical so that a light pulse is received at light barrier 7 at that moment of time when a tooth edge 22 of the engaging member 9 is positioned below and in the same radial plane as a locking edge 23 on pawl 13. A known electronic control device which is not illustrated receives the light pulse from the light barrier 7. If it is now desired to drive the driven shaft 8, the electronic control device will receive an additional signal pulse which will shut off the voltage to the magnetic coil 19 and the coil will become deenergized. As a result, the locking edge 23 of pawl 13 will be moved under the force of spring 12 into a position where it is engageable with a tooth edge 22 of engaging member 9. Upon abutting engagement of the pawl locking edge 23 with a tooth 22, the driven shaft 8 will become displaced and be driven in the direction of rotation of the engaging member 9.

The time required for the pawl 13 to become lockingly engaged to the engaging member 9 will depend upon the rotary speed of the engaging member 9 and also by the number of teeth 22 arranged on the periphery of the engaging member. This time delay will also depend on the restoring force of the spring 12 as well as the antimagnetic properties of the ring 17, pawl 13 and pawl support 11.

Upon the rotation of the driven shaft 8 and pawl support 11, the spring 12 also performs the function of compensating for the centrifugal force produced by this rotation and acting on the pawl 13.

The timer disk 14 which rotates with the driven shaft 8 is also provided with a number of holes or light slits 24 which correspond in number to the teeth 25 on the ratchet ring 17. In a similar manner, the timer disk 14 has the same angular relation to the ratchet ring 12 that a current pulse will occur when an abutment 26 on the pawl 13 moves below and past one of the teeth 25 on ring 17. The circuit of coil 19 is thus closed in connection with an additional signal pulse delivered when the pawl abutment 26 is in the same radial plane as a tooth 25 of ring 17.

The closing of the circuit of coil 19 will produce a magnetic field which attracts the pawl 13 toward the ring 17 so that its rear surface 27 is moved against an abutment surface 28 on the ring. As a result, the pawl support 11 is subjected to a deceleration until abutment 26 on pawl 13 abuts against a tooth 25 of ring 17. As a result pawl 13, engaging member 9 and driven shaft 8 will be stopped precisely in this position. This position can be predetermined in advance as would be required when this pawl clutch is used in high speed printers, carriage positioning devices, paper feed devices, character setting devices and other such devices which might be employed in office machines.

Thus it can be seen that the present invention has disclosed a simple but effective single or multirevolution pawl clutch in which the driven shaft can be stopped precisely in a position which has been previously determined.

It will be understood that this invention is susceptible to modification in order to adapt it to different usages and conditions, and accordingly, it is desired to comprehend such modifications within this invention as may fall within the scope of the appended claims.

What is claimed is:

1. In a single or multirevolution pawl clutch for coupling rotating transfer systems, such as high speed printing units in office machines, the combination of driving and driven shafts, a pawl mounted on said driven shaft, a stationary ratchet ring surrounding said driven shaft and engageable by said pawl, a driving member drivingly connected to said driving shaft and engageable by said pawl, spring means urging said pawl into engagement with said driving member, and a magnetic coil adapted to be selectively energized by pulse signals so that upon energization of the coil, said pawl is magnetically attracted into engagement with said stationary ratchet ring to disengage said driven shaft and upon deenergization of said coil said pawl is engaged with said driving member under the action of said spring means to engage said driven shaft.

2. In a pawl clutch as claimed in claim 1 and a housing, said driving and driven shafts being mounted on said housing, and light barrier means for each of said shafts fixedly mounted on said housing.

3. In a pawl clutch as claimed in claim 2 and a gear on said driving shaft and having a plurality of light slits therein corresponding in number to the teeth on said driving member, and a timer disk on said driven shaft and having a plurality of light slits therein corresponding in number to the teeth on said ratchet ring.

4. In a pawl clutch as claimed in claim 3 wherein said pawl has a locking edge engageable with said driving member and an abutment edge engageable with said ratchet ring, the light slits on said gear and timer disk having the same angular relationship as the teeth on said driving member and ratchet ring respectively whereby a control signal can be delivered at that point of time when a tooth of said driving member is positioned in a radial plane with said pawl edge and when a tooth of said ratchet ring is positioned in a radial plane with the abutment edge of said pawl.

5. In a pawl clutch as claimed in claim 4 wherein the engaging of said pawl with one of said engaging member and ratchet ring is effected synchronously with a control pulse following a tooth edge of said driving member and a tooth edge of said ratchet ring respectively.

6. In a pawl clutch as claimed in claim 4 wherein said driven shaft is decelerated upon the magnetic attraction of said pawl to said ratchet ring until said pawl engages a tooth thereof to stop said driven shaft in a predetermined position.

* * * * *